No. 667,374. Patented Feb. 5, 1901.
J. A. G. TRUDEAU.
ELECTRIC HEATER FOR LIQUIDS.
(Application filed Apr. 4, 1900.)
(No Model.)
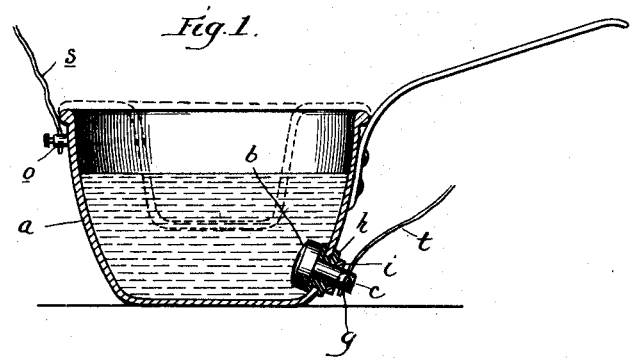
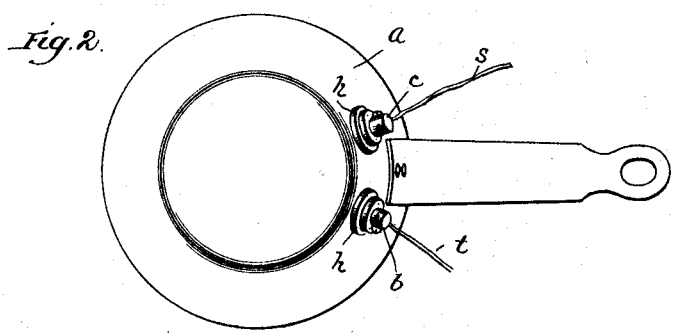

UNITED STATES PATENT OFFICE.

JOSEPH A. G. TRUDEAU, OF OTTAWA, CANADA.

ELECTRIC HEATER FOR LIQUIDS.

SPECIFICATION forming part of Letters Patent No. 667,374, dated February 5, 1901.

Application filed April 4, 1900. Serial No. 11,433. (No model.)

*To all whom it may concern:*

Be it known that I, JOSEPH A. G. TRUDEAU, of Ottawa, Province of Ontario, and Dominion of Canada, have invented an Improvement in Electric Heaters for Liquids, of which the following is a specification.

My invention relates to electric heaters for liquids, and is fully set forth in the following specification and shown in the accompanying drawings.

When a current of electricity is passed through a liquid, heat is produced by the resistance of the liquid, which itself acts as the conductor, and my invention is designed to enable the heat thus produced to be utilized for practical and commercial purposes.

Owing to the very high resistance of water and certain other liquids, it is not practical to use them in their natural or normal state, and the resistance of such liquids must be reduced by artificial means to render them available for the purposes of my invention. In my heater a liquid of low resistance, or with its resistance reduced by the addition of some chemical, is heated by the passage through it of an electric current between electrodes which are the terminals of an electric circuit, the liquid itself being utilized as the resisting medium and the heat being generated by the passage of the electricity in the liquid itself. When water is the liquid to be heated, I decrease its resistance by the addition of carbonate or other salt of sodium, borax, sulfuric acid, or other substance having like power of affecting the resistance, the proportions varying with the quantity of water used and the resistance required. Carbonate of soda or its equivalent when used in the proportion of one pound to fifty gallons of water will give good results at a pressure of fifty volts, and the amount of current can be regulated at will by varying the proportions. The flow of the current and the resulting heat may also be varied by adjusting the electrodes to or from one another, since the closer the electrodes the more the current and the greater the heat. The variation in heat may also be obtained by changing the depth of the immersion of the electrodes exposed to the liquid, since the greater the surface of the electrodes exposed to the liquid the greater the quantity of heat developed. The current and resulting heat may thus be controlled and varied at will without the use of special and complicated switches, such as are required with the present forms of heaters.

Another advantage of my heater is that there are no delicate parts to burn out or corrode, as in heaters where fine resistance-wire or resisting compound is employed.

For domestic or other purposes my new electric liquid-heater may be readily applied to a great variety of practical uses, both where the liquid to be used is directly heated by this method and where the electrically-heated liquid is used as a means of heating a second vessel and liquids, foodstuff, or matter contained therein.

The electrodes between which the current passes through the liquid to be heated may both be distinct from the containing vessel and insulated therefrom, or either electrode may consist of the vessel itself or of a portion thereof.

In the drawings, Figure 1 is a vertical sectional view of an electric heater for liquids embodying my invention. Fig. 2 is an inverted plan view illustrating a different form.

$a$ is the vessel which contains the liquid to be heated and which may be of any suitable form or shape, according to the purposes for which the heater is intended. In the construction shown in Fig. 1 one of the electrodes consists of the metal walls of the containing vessel, which are electrically connected through a suitable binding-post $o$ with one of the wires $s$ of an electric circuit. $b$ is the other electrode, which is carried by and suitably insulated from the vessel $a$ and projects into the interior of the vessel, below the surface of the liquid contained therein. The electrode $b$ is connected with the other wire $t$ of the electric circuit. As shown, the electrode $b$ consists of a metallic piece within the vessel having a shank $g$ projecting through an aperture in the body of the vessel and insulated by a sleeve $h$ of insulating material, which also serves as a plug to close the aperture and prevent leakage. The electrode is secured in place in any convenient manner, as by a collar $i$, soldered or otherwise fastened on the projecting end of the shank $g$. With this construction the current in passing from the electrode $b$ to the walls of the vessel, or vice versa, traverses the liquid contained therein and heats it in the manner described.

In the construction shown in Fig. 2 instead of utilizing the walls of the vessel as one of the electrodes a second electrode $c$, similar to the electrode $b$, is employed and connected with the wire $s$. In this construction the current passes through the liquid from the electrode $b$ to the electrode $c$, or vice versa, both electrodes being of course submerged in the liquid.

If desired, the vessel $a$ may be provided with an inner vessel, as shown in dotted lines in Fig. 1, forming an intermediate space to contain the liquid to be electrically heated. The material to be used is placed in the inner vessel and heated by the heat transmitted from the surrounding body of electrically-heated liquid.

I do not mean to limit myself to the details of construction shown, which may be varied without departing from the invention.

What I claim as new, and desire to secure by Letters Patent, is as follows:

1. An electric heater for liquids, consisting of a vessel adapted to contain the liquid to be heated, a short metal electrode projecting through the wall of said vessel into the interior thereof close to the bottom so as to be wholly below the liquid-level under normal operation, and an insulating and liquid-tight packing between said electrode and the wall of the vessel through which it projects.

2. An electric heater for liquids, consisting of a vessel adapted to contain the liquid to be heated, two short electrodes arranged near together and each projecting through the wall of said vessel into the interior thereof close to the bottom so as to be wholly below the liquid-level under normal operation, and an insulating and liquid-tight retaining-packing between each of said electrodes and the wall of the vessel through which it projects.

3. An electric heater for liquids, consisting of a vessel adapted to contain the liquid to be heated, a short metal electrode adapted for connection with a circuit of one polarity located within the vessel near its bottom so as to be below the level of the liquid therein in normal operation and having a large head and outwardly-extending shank projecting through an aperture in the lower portion of the side wall of the vessel, and an insulating and liquid-tight packing firmly clamped and embedded between said shank and the wall of the vessel through which it projects.

In testimony of which invention I have hereunto set my hand.

JOSEPH A. G. TRUDEAU.

Witnesses:
 D. J. McDOUGAL,
 JOHN I. MACCRAKEN.